H. PHILIPPEAU.
SPEED MULTIPLYING AND REDUCING GEAR.
APPLICATION FILED OCT. 15, 1919.

1,368,570.

Patented Feb. 15, 1921.

Inventor:
Henry Philippeau,

H. PHILIPPEAU.
SPEED MULTIPLYING AND REDUCING GEAR.
APPLICATION FILED OCT. 15, 1919.

1,368,570.

Patented Feb. 15, 1921.
5 SHEETS—SHEET 3.

H. PHILIPPEAU.
SPEED MULTIPLYING AND REDUCING GEAR.
APPLICATION FILED OCT. 15, 1919.
1,368,570.
Patented Feb. 15, 1921.
5 SHEETS—SHEET 4.
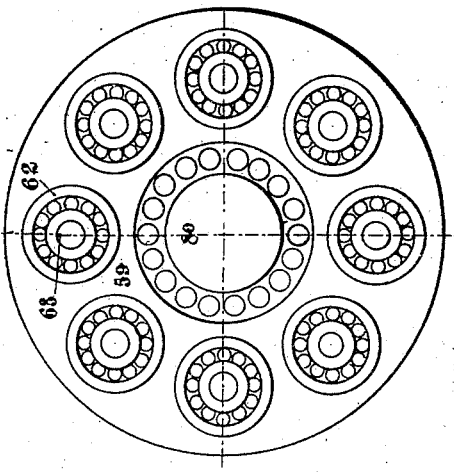
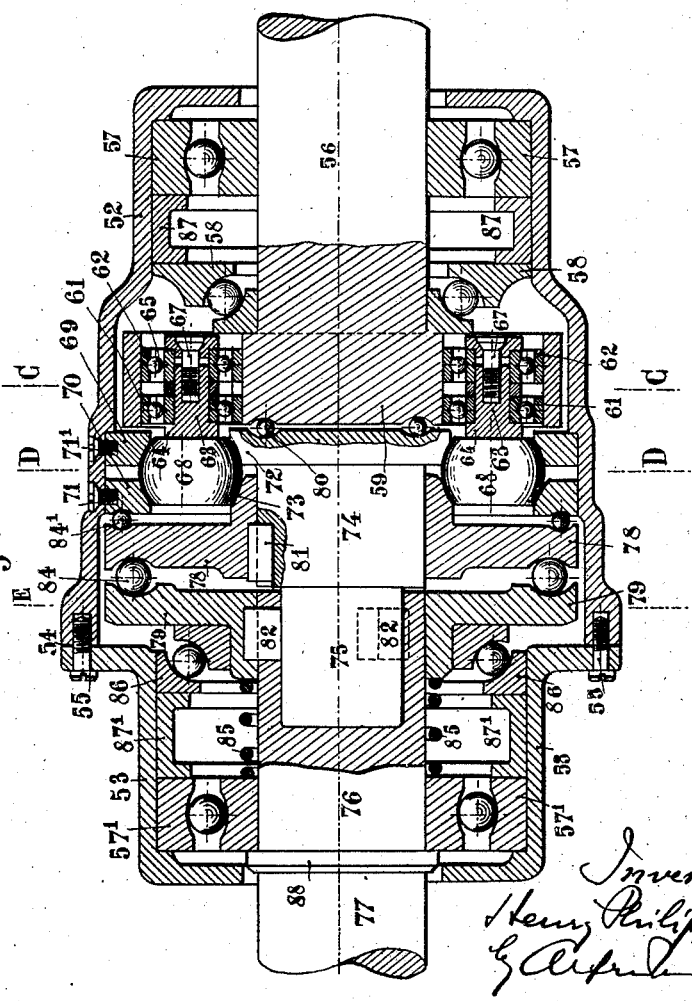

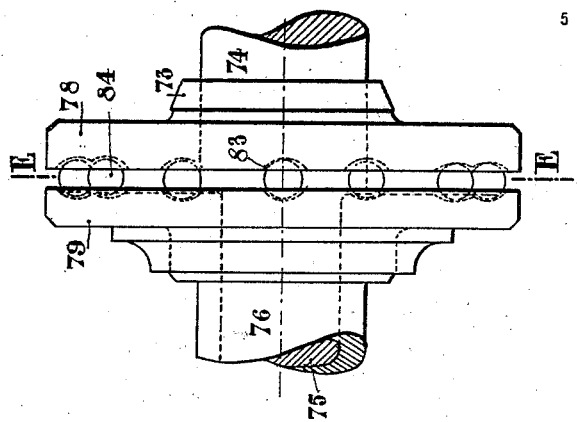
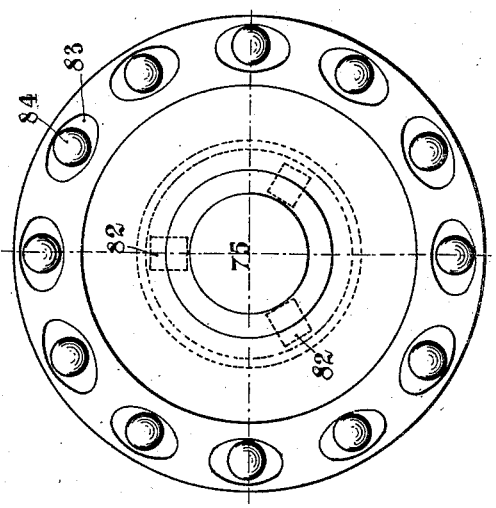
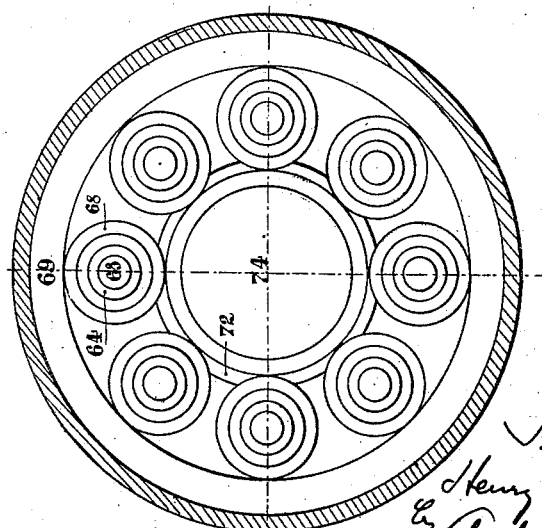

UNITED STATES PATENT OFFICE.

HENRY PHILIPPEAU, OF SCEAUX, FRANCE.

SPEED MULTIPLYING AND REDUCING GEAR.

1,368,570.  Specification of Letters Patent.  Patented Feb. 15, 1921.

Application filed October 15, 1919. Serial No. 330,773.

*To all whom it may concern:*

Be it known that I, HENRY PHILIPPEAU, a citizen of the Republic of France, residing at Sceaux, France, have invented certain new and useful Improvements in Speed Multiplying and Reducing Gears, of which the following is a specification.

The subject of the present invention is an arrangement for enabling the change from one given speed to another, with a very elevated rate of multiplication or reduction, by the use of simple elements, compact and capable of absorbing, for their proper action, only a very minimum proportion of the power originally exerted. The arrangement in question comprises, in effect, only ball bearings.

The principle on which the multiplying apparatus is based is the following: If an ordinary, annular ball bearing is taken, of the type of those called "cage bearings" and, rendering the outer race immobile, the intermediate cage is turned, it is observed that the inner race turns with a speed of 2 to 3 (or more) times greater than that imparted to the intermediate cage. Correspondingly, the inverse effect (reduction of speed) is observed if it is the inner race which is turned. The rate of multiplication (or of reduction) is, as is correct, a function of the ratios which exist between the proportions of the several constituent rotary elements considered: the external diameter of the inner race, the internal diameter of the outer race, and, consistently, the diameter of the balls.

If, in the interior of a bored tube of suitable diameter, a certain number of identical annular ball bearings are disposed, one can impart an initial speed to the cage of the first of these bearings, and transmit the speed which will have been obtained by the inner race of the 1st bearing to the cage of the 2nd bearing, by means of a circular extension of the said inner race suitably connected to the cage of the second bearing.

If, finally, this 2nd bearing is disposed the same in relation to the 3rd, this latter in relation to the 4th, etc. . . . for the inner race of the last bearing thus grouped, will be obtained definitely a speed equal to the initial speed imparted to the 1st bearing multiplied by a rate of which the value will be the rate of multiplication proper to each bearing (according to their constructional characteristics) raised to a power equal to the number of bearings employed. In order to fix the ideas in this respect, if it is admitted that the proper rate of multiplication of a bearing is 2.5 (the most frequent case), the total rate for an apparatus constituted by 6 bearings, 5 of which are active, would be very near 100 to 1.

There is reason to observe, that in the arrangement described above, the crown of balls of each constituent bearing plays the part of a gear or rather, planet movement transmission roller, between the outer race and the inner race. It is known that it is a principle that all intermediate gears, interposed between two relatively moving parts, cannot modify the speed ratios, which remain equal to that of the diameters of the two extreme moving parts. This is true when the axis of the intermediate moving part is fixed, but when, as in the present case, it concerns a planet system interposed between an inner race and an outer race, the ratio is increased by 1. Thus, in the case in which the diameter of the rolling path of the outer race is 60 m/m and that of the inner race 40 m/m, the rate of multiplication, instead of being equal to the ratio $\frac{60}{40}=1.5$ becomes, with the planet transmission, which a ball-bearing provides $1.5+1=2.5$.

The present invention is based on the preceding observation and essentially consists in a speed-change device, comprising as a transmission gear a complete ball-bearing acting as the intermediary element between an exterior crown-wheel of great diameter and an inner shaft of a diameter as small as desired. It is moreover not necessary to exaggerate the extreme diameters, as one can, if necessary, obtain a high degree of speed-change, in causing a first system to react upon a second and, if one so desires, this second system on a third, etc. One thus realizes several successive stages of speed-change.

Several embodiments of my invention are, by way of example, illustrated on the accompanying drawings, in which Figures 1 and 2 show in longitudinal section and bottom plan view respectively one construction. Fig. 3 is a longitudinal section of a modification.

Fig. 7 shows in longitudinal section a modification of the preceding arrangements particularly applicable to the propellers of aeroplanes.

Fig. 8 is an end view along the line C—C of Fig. 7.

Fig. 9 is another transverse section taken along the line D—D of Fig. 7.

Fig. 10 shows in elevation one of the members of the arrangement shown in Fig. 7, Fig. 11 is an end view along the line E—E of Fig. 10.

Figure 1:
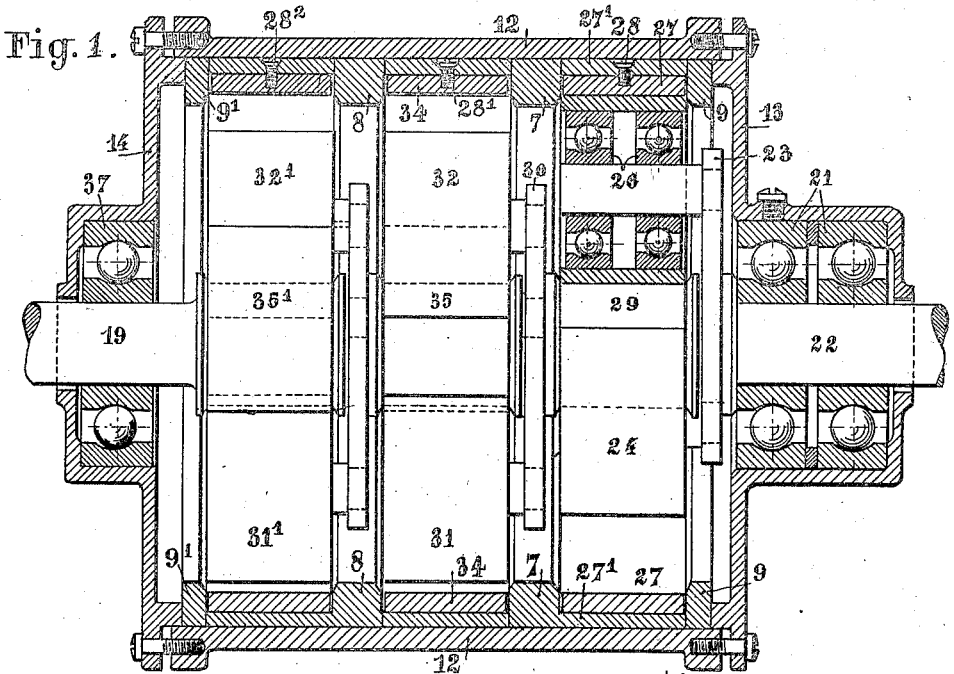
Figure 2:
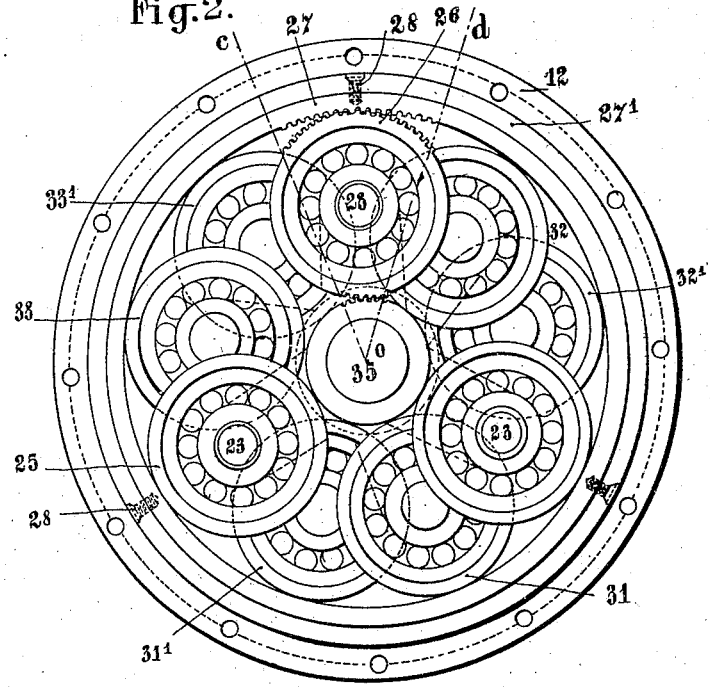
Figure 4:
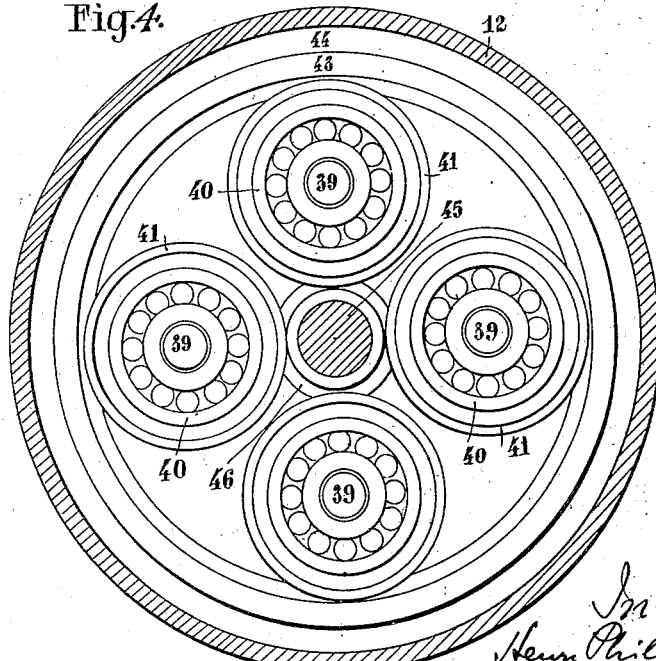
Fig. 4 is a transverse section taken along the line A—A of Fig. 3.
Figure 6:
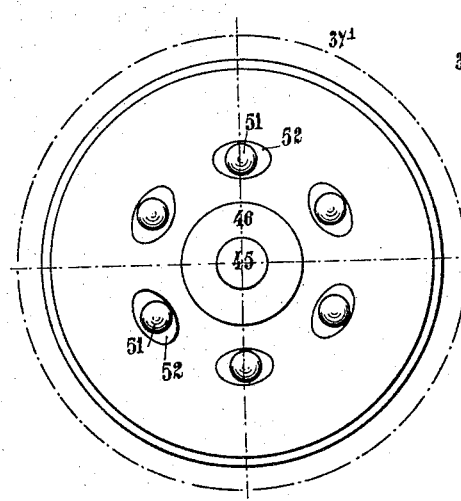
Fig. 6 is an end view along the line B—B of Fig. 5.
Figure 5:
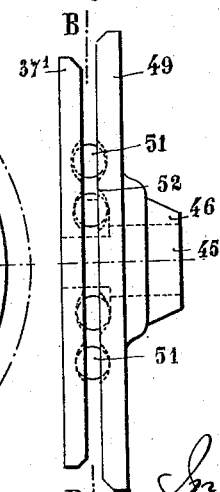
Fig. 5 shows, in elevation, one of the elements of the arrangement shown in Fig. 3.

The construction as shown in Figs. 1 and 2 comprises the following elements.

A ball bearing 21 supports the primary shaft 22 provided with a shoulder on which is secured a piece 23 of plate steel cut in the form of a three armed star, each of which entrains one of three ball bearings 24, 25, 26, running on an elastic ring 27 of spring steel, which grips them in exerting on them a slight pressure, playing, so to speak, the part of a sort of metallic strap. A second thicker ring $27^1$ rigid and slightly larger than the first, embraces this latter, a very small play being provided between the rigid outer ring and the elastic inner ring, which thus conserves a certain flexibility and is solely prevented from turning by three small equidistant screws 28, $28^1$ and $28^2$, which passing through the outer ring, enter three corresponding holes formed in the elastic ring on the outer face of this latter. The three ball bearings 24, 25 and 26 transmit to a central shaft 29 against which they are pressed, the planetary movement of rotation which results from their rolling on the steel elastic ring 27. The rate of multiplication obtained is equal to the value of the ratio which exists between the internal diameter of the elastic ring and the diameter of the central shaft, a value increased by 1, following the rule which has been propounded above in respect to the first method of carrying out the speed multiplier-reducer.

On an enlargement of the central shaft 29, is secured a second star piece 30 similar to the piece 23 and which drives a second system of three ball bearings 31, 32, 33, which running on the interior of an elastic ring 34 identical with the ring 27 of the 1st system, press and entrain, with the same rate of multiplication, a second central shaft 35, which, if the proportions indicated by the adjoining outlines are assumed for the constituent parts of the apparatus, would turn at a rate of 25 revolutions to one revolution of the primary shaft, the proper rate of multiplication of each of the systems of three ball bearings being $\frac{5}{1}$. A third system could be arranged to follow, and then the total rate would be 125/1 (i. e. $5^3$).

There is occasion for adding that the three systems of three bearings with their elastic and rigid rings and their central shafts, are arranged in the interior of a drum 12 which serves to inclose and mount the whole; intermediate rings 7, 8, 9 maintain the necessary separations, and finally the drum 12 forming the casing is closed by two covers or disks 13, 14, on one of which is secured the two ball bearings 21, which support the primary shaft 15, the other carrying the bearing 37 which supports the secondary shaft 19.

Although the described apparatus is theoretically reversible and capable of being employed as a speed multiplier or reducer indifferently, it is advisable to consider that such second application implies almost always the necessity of exerting an appreciable effort to overcome a more or less considerable resistance; now, in these two arrangements, the rotary movements are transmitted only by rolling elements, balls or rollers, acting by simple friction. It may therefore be feared that slipping may take place, which might cause inconvenience or even danger if, for example, it related to hoisting appliances. These defects can easily be avoided, by always providing the rolling surfaces, central shafts, rollers, and elastic rings, with transverse, straight, helicoidal or V-shaped flutings, which flutings could very simply and very economically be produced by impressing before tempering.

This arrangement is indicated in Fig. 2 in the sector comprised by the angle formed by the radii c, o, d. It must be employed in all cases where the ratio of the primary and secondary speeds must be maintained rigidly constant.

Figs. 3, 4, 5 and 6 show a second embodiment characterized by an arrangement serving to secure the adherence of the rollers with their rolling surfaces (and in consequence to insure the drive of the various parts of the system) by a result of the reaction of the resistance to be overcome, and this under such conditions that the adherence secured is always and automatically proportional to such resistance. The primary shaft 15 is supported by the ball bearing 34 and by the thrust ball bearing 38 which opposes its displacement in the direction of the motor. On the inner side of the apparatus, the primary shaft ends in a disk 37 which carries four fingers 39 engaging in the axial holes of four ball bearings 40 arranged as a crown, in opposite pairs and embraced by a half round ring 41, which transforms each of the said bearings into a kind of spherical roller. The said rollers possess four points of contact with their rolling paths: The first with the outer rolling path 42, fixed in the sense that it is abutted toward the motor shaft by a projection of the cover plate 13, which on this side closes the casing 12 inclosing the entire system, the second with the outer rolling path 43, movable in that it can move away from or approach more or less the rolling path 42; but the outer rolling paths 42 and 43 cannot turn, they are precluded therefrom by a certain number of pins (three at the least on the periphery of each circular rolling path) embedded in the fixed spacing rings 44. These pins immobilize the outer rolling paths, in respect to rotation while entirely leaving them a certain play in the longitudinal direction. The third point of contact of the spherical rollers 36 takes place with the inner rolling path 45, and the fourth with the inner rolling path 46. These two rolling paths are mounted concentrically, one 45 serving as a journal to 46; the journal-rolling path 45 cannot advance nor retreat in the longitudinal direction, by reason of the thrust ball bearings 47 interposed between same and the disk 37; the sleeve bearing 46, by virtue of a feather 48 is fast with the journal bearing 42 as regards rotation, but it possesses relatively to this latter, a slight play in the longitudinal direction. Toward the rear of the system, i. e., on the side opposite to the primary shaft, the bearing 46 is enlarged into a disk 49, which is placed in contact with the non-rotary rolling path 43 and can even transmit a thrust to this latter, through the medium of the crown of balls 50. Behind the disk 49 and mounted like same concentrically to the journal bearing 45, is another disk $37^1$ similar to the disk 37, and otherwise similarly arranged. Between the two disks 49 and $37^1$ the drawing shows a crown of balls 51 which do not have a continuous circular rolling path but are located in a series of six sockets formed symmetrically in respect to one another in each of the two disks 49 and $37^1$ on the opposing faces thereof. The separation provided between the two disks is such that one of the balls 51 is accommodated exactly in the deepest part of the space formed by two opposite recesses. Under such conditions it is to be observed that the rotation of one of these disks cannot occur without causing either the rotation of the other, or the recession of the said disk, because as a result of the relative displacement, each ball no longer finding its seat in the maximum hollow of the sockets, in view of the slopes thereof forces the disks apart. This retiring movement subjected to exclusively by the disk 49, which alone can displace itself longitudinally, is transmitted directly to the axial rolling path 46 which is integral with the disk 49, and, indirectly, by the medium of the crown of balls 50 forming an abutment to the outer rolling path 43. It is this arrangement which automatically insures, as has been stated above, the inter-adherence of the rollers and their rolling paths, always proportional to the resistance to be overcome. The disks $37^1$ and $37^2$ fulfil, in respect to the two other systems of rollers $49^1$ and $49^2$ the same role as the disk $37^1$ in the arrangement just explained. The same organs, similarly arranged and having the same references (excepting the indices 1 and 2) are to be found again in this second and this third train and acting in the same manner, each system multiplying (like in the embodiment before described), the speed first of all obtained by the rate of multiplication proper to each train. For a system of three trains, such as shown on the drawing, the total multiplication will be therefore $M^3$ (M being the initial rate); this speed is finally the value transmitted by the disk $37^3$ to the secondary shaft 19, supported by the bearing $34^1$ and the ball thrust bearing $38^1$, which opposes itself to the recoil in the direction opposite to that of the primary motor shaft.

All these arrangements would act the same, but in the opposite sense, if the apparatus were employed as a reducer of speed, the shaft 19, become the primary motor shaft, transmitting to the shaft 15 its speed reduced according to the total rate of reduction obtained by the system.

Finally Figs. 7, 8, 9, 10 and 11 show an arrangement specially designed for driving aerial propellers, an application which may be considered as one of the most interesting of the new multiplying-reducing bearing, since it would enable the speed of motors (therefore that of aeroplanes) to be increased considerably and as far as it would be desirable without it being necessary to impose this increase of speed on the propellers. The desired reduction would be obtained without employing toothed gearing nor intermediate shafts, the propeller being, as in ordinary arrangements, mounted directly on the extension of the engine shaft.

It no longer is a question of obtaining a high rate of reduction or, multiplication such as 50—100—125 to one, obtained by the types of bearing multipliers which form the subject of the preceding paragraphs; rates of reduction of 2, 2.5 or 3 to one would suffice to give a propeller a speed of 800 to 1000 revolutions or more, with a motor rotating at speeds of 2,800 or 3,000 revolutions or even more.

The whole is inclosed in a two piece casing 52 and 53 connected at 54 by a crown of screws 55. This casing has internally several shoulders against which abut the various pieces hereafter enumerated.

The motor shaft 56, supported by the ball bearing 57 and by the ball thrust bearing 58 which prevents its displacement in the direction of the motor, has at 59 an enlargement in the form of a circular disk of which Fig. 8 shows an end view. On the periphery of the said disk, eight cylindrical cavities 60 are formed, of which each serves as a seating to a unit composed of two ordinary ball bearings 61 and 62, through the center of which passes a spindle 63, a shoulder 64 of which abuts against the outer face of the inner rolling path 61; an intermediate ring 65 maintains the separation of the two bearings and the clasp of the whole is insured by a shouldered plug 66 bearing against the outer surface of the ball bearing 62 and by a screw 67 which holds the entirety. This screw is eccentric to avoid any unscrewing occurring owing to the rotation, whatever the direction. Each of the spindles 63 beyond its above mentioned shoulder 64, is enlarged into a spherical roller 68; the inner face of the disk 59 therefore is a crown of eight of these rollers, as shown.

Each roller 68 has four points of contact with its rolling paths; the first with the outer circular rolling path 69, fixed in the sense that it is butted on the motor shaft side, against an internal shoulder of the casing 52; the second with the outer circular rolling path 70, mobile in so far as it can more or less approach or recede from the ring 69. On the other hand, the two rolling paths 69 and 70 cannot turn, they are prevented therefrom by the presence for each ring, of three equidistant screws, which passing through the wall of the casing 52 engage in the corresponding socket holes, formed in the rings 69 and 70; one only of these screws per ring is visible on the drawing at 71 and $71^1$. The third point of contact of the rollers 68 takes place with the inner rolling path 72 and the fourth with the inner rolling path 73. The rolling path 72 is integral with the spindle 74 of which the most narrow cylindrical portion 75 engages in a corresponding cylindrical cavity 76 formed in the end of the propeller-carrying shaft 77. The rolling path 73 is integral with a disk 78 which itself is part of a device of which Fig. 10 shows a longitudinal elevation and Fig. 11 an end view of the counter disk 79. The spindle 74 cannot move longitudinally in the direction of the disk 59 of the shaft 56, its movement is restricted by the thrust ball bearing 80, in the direction of the shaft 77, the extreme surface of the spindle 75 bears against the base of the cavity 76. The disk 78 of which the boss 73 constitutes one of the rolling paths of the rollers 68, can slide longitudinally on its journal 74, but it can turn only therewith, by reason of the feather 81. The counter disk 79, mounted opposite to the disk 78, on the end of the shaft 77 cannot advance nor recede, nor turn on this shaft without entraining same in its movement; it is precluded therefrom by the three inclosed feathers 82 Fig. 11, which passing through three mortises formed in the wall 76 of the cavity 75 and inserted from the interior thereof, before the introduction of the journal 75, engage in three recesses formed in the boss of the counter disk 79 and permitting only slight longitudinal displacement of about 1 m/m. Each of the faces of the disk 78 and of the counter disk 79 which oppose one another carry a crown of twelve recesses 83. The separation between the two disks is such that a ball 84 is exactly accommodated in the deepest part of the space formed by two opposing recesses. Under such conditions it is to be observed that rotation of one of these disks cannot occur without causing either rotation of the other, or the recession of the said disk. The initial contact and the adherence of the rolling paths 70 and 73 are ensured through the medium of the disks 78 and 79 and the crowns of balls 84 and $84^1$ by the pressure of the spring 85, which bears against the inner face of the inner ring of the ball bearing $57^1$, which supports the propeller-carrying shaft 77. This latter is also held and prevented from longitudinal displacement toward the front by the ball thrust bearing 86, bearing against the intermediate ring $87^1$, which fulfills on the shaft 76 side the same role as the intermediate ring 87 on the motor shaft 56 side. A collar 88 serves as an abutment for the bearing $57^1$, supporting the shaft 77. All the constituent elements of this reducing bearing arrangement, especially applied to aerial propellers being now enumerated and described, and their relative positions indicated, it is easy to recount the action of the apparatus: When the motor is set in operation, its speed, transmitted by the shaft elements 77—76—75—74 to the rollers 72 and 73, is communicated by these latter to the planet rollers 68 and in consequence to the disk 79, with which they are integral, and by same to the shaft 56, with a reduction of $\frac{1}{4}$ in the case shown. The disk 79 is first entrained then 78 opposes a resistance to movement; but it has been seen, that by the set of balls 84 in their recesses 83, the slightest displacement of the disk 79 relative to the counter disk 78, causes a recession of this latter toward the rollers 68, this recession, to which the rolling path 73 is directly subjected, and transmitted to the rolling path 70 by the crown of balls $84^1$, results in increasing the adherence of these rolling paths and rollers, and this the more forcibly as the more powerful is the resistance.

The action of this arrangement therefore has the effect, as in those which are shown in Figs. 3 to 6, of automatically producing an adherence between the rollers and their rolling paths, always proportional to the resistance to be overcome, the drive is therefore insured whatever be the resistance, all while preserving smoothness, due to the absence of all shock, which characterizes transmission of movement by friction and rolling, without toothed gearing. It should be noted that the above described arrangement can only operate under the condition that the casing 52—53 be held immobile in respect to the shafts 56 and 77 and rendered, for example, fast with the motor, but on the drawing no method of attachment is shown, the disposition of which could be varied according to circumstances.

To close this description a brief enumeration will be made of the most interesting applications of the bearing speed multiplier and reducer which can be foreseen; as follows:

1st as multiplier:—

For driving fans, milling and polishing machines, dynamos (by slow speed engines), cream separators, centrifugal extractors, sirens:—in aviation, for the rapid rotation of propellers, without it being necessary to require an excessive speed of the motor; for the purely mechanical projection of projectiles, the pracitical realization of centrifugal machine guns of large discharge and continuous action, is enabled.

2nd as reducer:—

For the construction of hoisting apparatus; lifting jacks, tackles, etc., for driving all kinds of mechanical elements by high speed motors; electro-motors, internal combustion engines, turbines, etc., of which the speed must be considerably reduced.

A perfect solution of the reduction of speed in turbo-motors: steam and gas turbines, etc., would be realized. This latter application is indicated very particularly as one of the most interesting uses of the bearing as a reducer of speed.

I claim:

1. A speed change gearing comprising in combination with a stationary casing a plurality of elementary gears, each one comprising planet gears, shafts carrying said planet gears, a transmission shaft, a main disk fast on said transmission shaft, the shafts carrying the planet gears being mounted in said main disk and being arranged at the same distance from the axis of said transmission shaft, a second transmission shaft, a central member secured thereto, rolling paths secured to the said stationary casing, the said planet gears being in mesh on the one hand, with the periphery of said central member and, on the other hand, with the said rolling paths with roller-bearings interposed between the said planet gears and the shafts in the said main-disk, the rolling paths being formed of an inner elastic member pressing the planet gears against the said central member, the planet gears thereby entraining the said member, and an outer rigid member secured both to said stationary casing and the said inner elastic member.

2. A speed change gearing as set forth in claim 1, in which the rolling paths are made in two parts, one being secured to the stationary casing and the other being movable parallel to the axis of the transmission shaft, but being prevented from rotation, an auxiliary disk mounted on each primary driven shaft, a disk rotatable with each primary driven shaft but movable relative thereto parallel to the common axis of the said disk and shaft, an extension of said auxiliary disk coöperating with an enlargement of the said primary shaft for constituting a rolling path for the planetary gears on this shaft, the auxiliary disk, the part of the rolling path secured to the stationary casing the main disk of the planetary gears, the driving disk of the outer shaft being provided on their faces with crowns of recesses of suitably selected radii, each of these recesses being of elongated shape, of irregular depth, the maximum depth of these recesses being about equal to the radii of the balls lodged therein, these recesses being uniformly distributed over a circumference concentric with the axis of the transmission shaft, such crowns of recesses of suitably selected radii being arranged in the two faces of the auxiliary disk, in the movable part of the rolling path secured to the casing, in the face of the main disk of the planetary gears, the adjacent face of the auxiliary disk and the face of the disentraining the outer shaft, and thrust ball bearings interposed between the driven shaft, the various primary shafts and the drive shaft.

In testimony whereof I have affixed my signature in presence of two witnesses.

HENRY PHILIPPEAU.

Witnesses:
  CHAS. P. PRESSLY,
  MARCEL GUILLEMOT.